United States Patent [19]
Dransfield

[11] 3,951,229

[45] Apr. 20, 1976

[54] METHOD AND APPARATUS FOR IMPARTING A SEISMIC PULSE TO THE EARTH

[75] Inventor: Clifford D. Dransfield, Dallas, Tex.

[73] Assignee: Atlantic Richfield Company, Los Angeles, Calif.

[22] Filed: Dec. 26, 1973

[21] Appl. No.: 427,929

[52] U.S. Cl.................................. 181/114; 181/117; 340/17 R
[51] Int. Cl.² .......................................... G01V 1/02
[58] Field of Search ............ 181/114, 117; 248/207, 248/224; 340/17; 91/412

[56] References Cited
UNITED STATES PATENTS

| | | | |
|---|---|---|---|
| 2,897,907 | 8/1959 | Blount et al. ........................ | 181/114 |
| 3,277,977 | 10/1966 | Silverman ............................ | 181/114 |
| 3,474,880 | 10/1969 | Gundlach............................. | 181/117 |
| 3,516,509 | 6/1970 | Coburn et al........................ | 181/117 |

*Primary Examiner*—Nelson Moskowitz
*Attorney, Agent, or Firm*—Robert M. Betz

[57] ABSTRACT

An apparatus and method for controlling the travel of a vehicle mounted seismic gas exploder adapted to deliver a downwardly directed pulse to the earth and thereafter be driven in an upward direction by the resultant reaction force. The exploder is flexibly coupled by means of a rope and pulley arrangement to the piston rod of a hydraulic cylinder. Compressed coil spring means aligned with the cylinder are released when the exploder jumps upward and apply a force to extend the piston rod and in so doing cause the rope to be retracted with gradually diminishing force. The exploder may be held at the upper limit of its travel, and its subsequent descent is utilized to recompress the spring means.

22 Claims, 5 Drawing Figures

METHOD AND APPARATUS FOR IMPARTING A SEISMIC PULSE TO THE EARTH

BACKGROUND OF THE INVENTION

1. Field of the Invention

This invention relates generally to actuating mechanisms for seismic gas exploders of the type including an impacting mass by means of which a downwardly directed impulse is applied to the earth and which is subsequently driven upwardly by the resultant reaction force. The invention is more particularly concerned with mechanisms of this type designed to guide and "catch" a vehicle mounted seismic gas exploder of the type described and thereafter cushion its descent.

2. Description of the Prior Art

One problem which exists with the type of vehicle mounted seismic gas exploder described stems from the fact that the bottom of the impacting mass or so-called pan may settle against rocks or upon sloping or uneven terrain. When the exploder is fired with the axis of the impacting mass tilted at an angle with the vertical, the resultant reaction force, instead of being directed vertically upward, may have a substantial lateral component tending to exert tremendous side loads upon the supporting structure and vehicle. If this supporting structure includes rigid vertical restraining guides, it may be damaged severely or fractured completely.

Retraction or lifting mechanisms for vehicle mounted seismic gas exploders also typically involve auxiliary apparatus such as engine driven air compressors, storage tanks, or hydraulic pumps to be used as power sources. Such auxiliary power sources must be triggered to operate in proper time relation to the firing of the exploder, and they also add considerably to the weight and space occupied by the overall unit, thereby detracting from the maneuverability of the transporting vehicle.

There is a need, therefore, for a vehicle mounted gas exploder whose upward travel may be controlled without endangering the integrity of the carrying vehicle and supporting members. There is a further need for a control mechanism for such an exploder which is both self-energized and self-regulating.

SUMMARY OF THE INVENTION

In accordance with a preferred aspect of this invention, a control apparatus is provided for use with a vehicle mounted seismic gas exploder. A platform mounted upstanding frame surrounding the gas exploder has supported within it from top to bottom a plurality of parallel elongated tensioned guide members spaced in a symmetrical array outwardly of the periphery of the gas exploder. These guide members have a semirigid construction and are elastically yieldable in a lateral direction to a limited degree. The gas exploder is provided with means which connect it with the guide members in such a manner that the exploder may ride freely therealong in a vertical direction subsequent to an explosion. A flexible lift rope extends from the top of the exploder over a series of pulleys by means of which it is coupled to the free end of the rod of a piston movable within a hydraulic cylinder fixed to the frame. Compression spring means interposed between the end of the piston rod and the cylinder continuously urge the piston outwardly from the cylinder in a direction to exert tension upwardly on the lift rope. Prior to firing, the spring means are disabled by the weight of the gas exploder; but as the exploder rises, the spring means expand automatically to extend the piston rod and retract the lift rope rapidly. When the exploder reaches the upper limit of its vertical travel, it may either be held in that position or allowed to descend gradually at a controllable rate and in so doing, the weight of the exploder recompresses the spring means for the next firing.

The pulleys which support the lift rope intermediate its two ends are so oriented that the rope will be retracted or lifted at twice the speed at which the piston rod moves and correspondingly travel twice the distance while the effective rope tension is halved from that on the piston rod. If the exploder moves upward with sufficient speed to cause momentary slackening of the rope, means are provided which automatically raise one of the pulley supports to re-establish the necessary rope tension, thus avoiding the possibility of sudden shock loading on the rope.

The invention also comprehends a method for controlling the travel of a vehicle mounted seismic gas exploder of the type described comprising the steps of actuating the exploder to impart a seismic pulse to the earth, applying the energy of compressed spring means released by the upward travel of the exploder to actuate a hydraulic lift device flexibly coupled to the exploder through a lift rope so that the rope is rapidly retracted, and exerting the weight of the exploder on the lift rope during its descent to recompress the spring means.

Accordingly, it is an object of this invention to provide a method and apparatus for controlling the travel of a seismic gas exploder of the type described wherein the supporting structure is isolated from undesirable shock loading.

It is another object of this invention to provide a control apparatus for a seismic gas exploder of the type described having reduced size and space requirements.

It is a further object of this invention to provide a method and apparatus for controlling a seismic gas exploder of the type described which eliminates the need for separate power sources.

It is yet another object of this invention to provide a control system for a seismic gas exploder of the type described which is automatically timed in proper relation to the firing of the exploder.

It is a still further object of this invention to provide a method and apparatus for controlling a seismic gas exploder of the type described whose power requirements are self-regulated.

These and other objects of this invention will become apparent from the following detailed description of the preferred embodiments of this invention and is illustrated in the drawings appended hereto.

DETAILED DESCRIPTION

Figure 1:
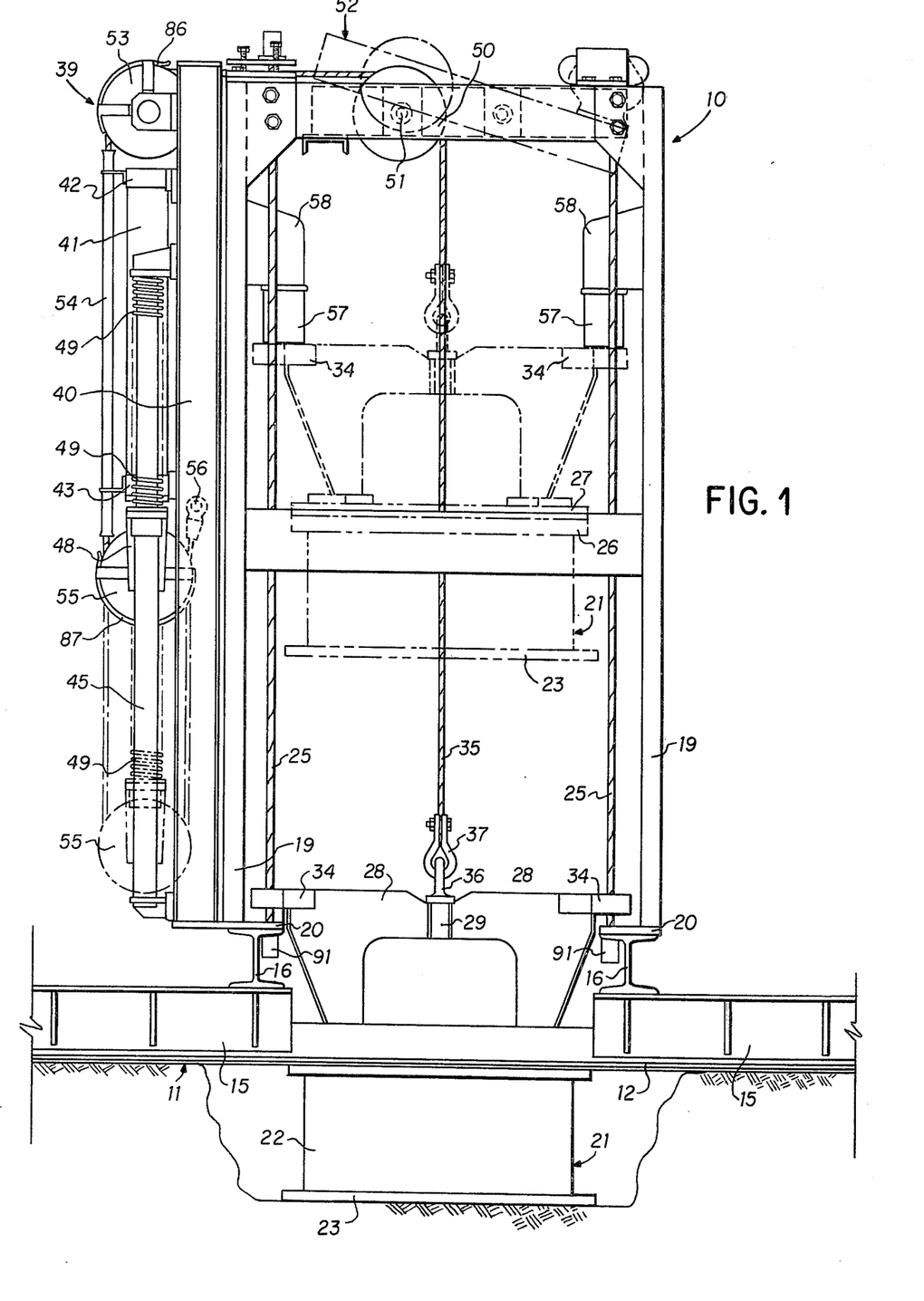
FIG. 1 is an elevational view of the overall apparatus of this invention taken from one side of the supporting vehicle.

With reference now to the preferred embodiment illustrated in FIG. 1 of the drawings, an upstanding frame 10 may be conveniently mounted on a transporting vehicle such as a sled 11, having runners 12 adapted to rest on the ground. Retractable wheels (not shown) can easily be added to enhance the versatility of the vehicle. The front and rear ends of the sled 11 have been omitted from the showing of the drawing as unessential to understanding of the invention. It will be understood also from what follows that within the scope of this invention the frame 10 may be mounted directly on the ground rather than being supported from a movable vehicle. As shown, the support means for the frame 10 may conveniently consist of pairs of horizontally flanged plates 15 bolted or fastened at suitable intervals to opposite vertical edges of the runners 12 so as to provide flat bearing surfaces for I-beams 16 extending transversely of the two sled runners 12. The bottom ends of each of four channel members 19 establishing the general outline of frame 10 may be secured to the I-beams 16 through a plurality of intermediate mounting pads 20.

Supported from the frame 10 and shown resting on the earth is a seismic gas exploder 21 which may be constructed in any of various ways well-known in the art. As shown, for example, it may include a cylinder 22 with an expansible explosion chamber therein and an impact mass or pan 23 formed on the bottom thereof. Also within the frame 10 and close to the four corners thereof formed by the channel members 19, there are positioned a like number of parallel elongated guide members 25, such as semi-rigid bright wire ropes or flexible fiberglass or steel rods having their ends attached respectively to the top and the bottom of the frame 10. The purpose of the guide members 25 is to direct the upward travel of the seismic gas exploder 21 subsequent to an explosion therein until it reaches the limit of its travel shown in phantom.

The top of the cylinder 22 may be provided with a flange 26 to which may be bolted or otherwise fastened an annular cover 27 formed with a central aperture to accommodate the travel of the reaction mass or piston (not shown) of the exploder 21. The cover 27 supports a spider assembly consisting of a plurality of radially extending arms 28 joined to a hub 29 concentric with the cylinder 22, the undersurfaces of the arms 28 being appropriately curved to provide sufficient clearance for piston movement. It will be understood that suitable connections (not shown) may be made to the upper surface of the piston for introduction into the expansible chamber of an explosive mixture in a manner well-known to the art. The extremities of the arms 28 are furnished respectively with split eyelet bushings 34 adapted to encircle the rope or guide members 25 so as to direct the seismic gas exploder 21 slidably therealong in an upward direction.

In firing the seismic gas exploder 21, particularly on uneven or sloping ground, the supporting structures and associated equipment can be subjected to tremendous side loads or shocks. With rigid vertical restraining guide members such as are provided in the prior art, the severity of these shocks can reach intolerable levels. Therefore, the guide ropes 25 are adapted to provide elastically yieldable restraint against sideways motion of the seismic gas exploder 21 in the event it is fired with the pan 23 at an angle. The degree of elastic restraint provided by the guide members 25 can be varied by adjusting the tension applied thereto in a vertical direction. Also, the mounting location of the upper ends of the ropes 25 can be adjusted so that they converge slightly from bottom to top to exert a progressively greater resistance to the upward movement of the seismic gas exploder 21 as it moves from the ground.

Attached to the hub 29 is one end of the lift rope 35 which may be fastened thereto by means of an eye bolt 36 at a mating clevis 37 to which one end of the lift rope 35 is clamped or otherwise securely fastened. After passing over the top of the frame 10, the lift rope 35 extends downwardly along one side of the frame 10 where it makes effective connection with the lifting mechanism 39 in a manner to be described. Finally, its other end is fastened to one of a pair of channels 40 extending vertically along the frame 10 midway between two of its adjacent channel members 19 by means of which the lifting mechanism 39 is mounted to frame 10.

Figure 2:
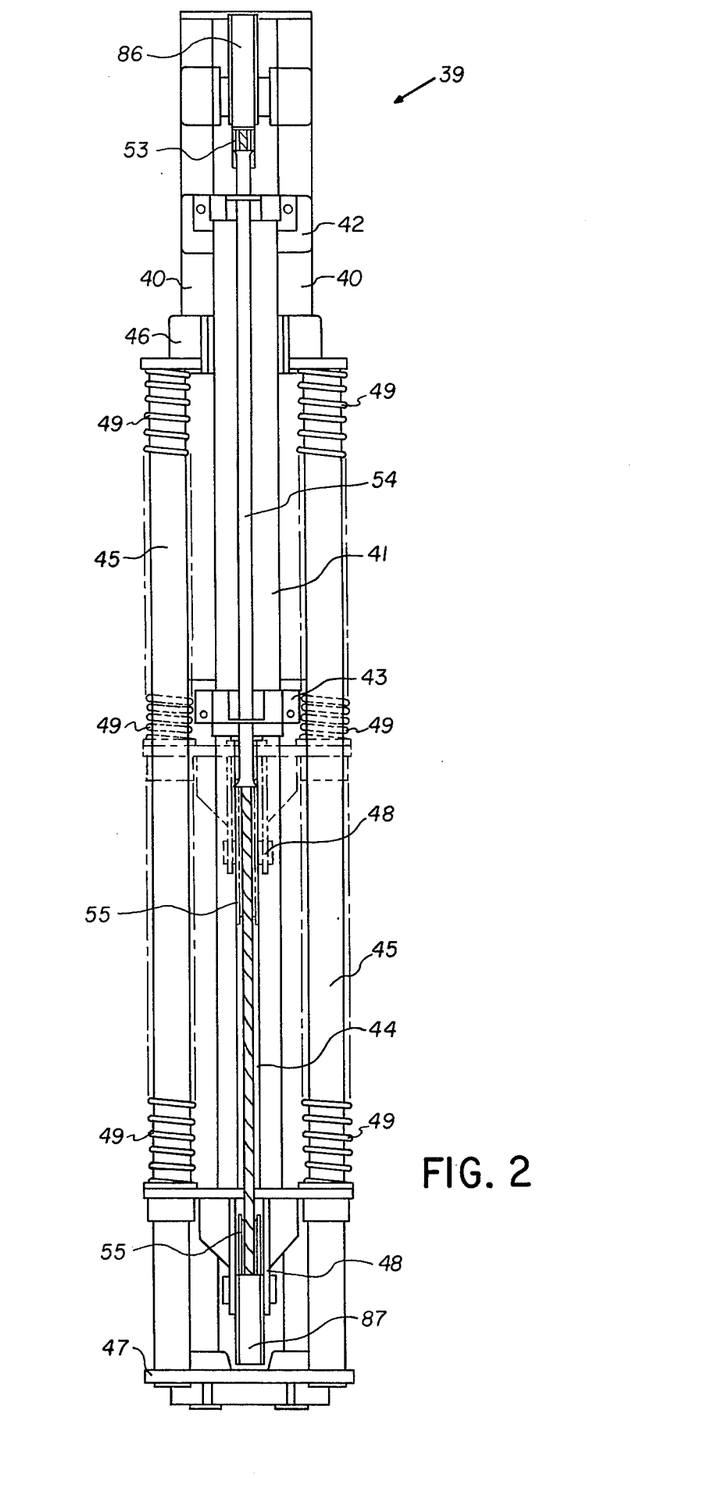
FIG. 2 is a detailed elevational view of the lifting mechanism of this invention taken from the front of the supporting vehicle.

The external mechanical features of the lifting mechanism 39 may be better appreciated by a consideration of FIGS. 1 and 2 together, the former presenting a side view thereof as attached to the frame 10 and the latter a frontal detail of the mechanism. In FIG. 1 the lifting mechanism 39 is illustrated with its movable elements in their upper position prior to firing of the exploder 21, their lower moved position after the exploder 21 has been fired and driven upwardly being shown in phantom. In FIG. 2 the lifting mechanism 39 is illustrated with the movable elements in their lower position, with the upper position thereof being correspondingly shown in phantom.

A hydraulic cylinder 14 extends in a vertical direction between the upper and lower mounting brackets 42 and 43 suitably fastened, as by welding, to the channels 40. The upper end of a piston rod 44 (FIG. 2) is attached within the cylinder 41 to a piston (not seen in this view) movable against variable fluid resistance, while the lower end of the piston rod 44 projects downwardly beneath the lower end of the cylinder 41. Extending along the two sides of the cylinder 41 in longitudinal alignment therewith are a pair of stationary cylindrical guide tubes 45—45 fastened at their respective upper ends to an upper end bracket 46 fixed to the channel 40 and at their lower ends to a lower end bracket 47 forming the bottom extremity of the lifting mechanism 39. The lower end of the piston rod 44 is threaded into or otherwise fixed to a yoke 48 having suitable laterally separated apertures therethrough to receive the guide tubes 45—45. These apertures are fitted with suitable bearing surfaces so that the yoke 48 will slide smoothly along the guide tubes 45—45 with extension or retraction of the piston rod 44 in a vertical direction. A pair of compression coil springs 49—49 are located around the two guide tubes 45—45, their upper ends adapted to bear against the upper brackets 46 and their lower ends against the yoke 48. Both ends of the springs 49—49, however, are free of any attachment to these bearing surfaces.

When the piston rod 44 is in its extreme upper position, as shown in FIG. 1, the springs 49—49 are under strong compression tending to urge the piston rod 44 in a downward direction until it is fully extended as shown in FIG. 2. In this lower position, the springs 49—49 are still under very slight compression.

The lift rope 35 constitutes means for flexibly coupling the seismic gas exploder 21 to the lifting mechanism 39 so that the latter may accomplish its desired functions of retracting the lift rope 35 during the upward travel of the seismic gas exploder 21 and thereafter holding the exploder 21 or controlling its gradual descent. This interconnection is accomplished by means of a series of pulleys rotatable about horizontal axes as will now be explained, best understood with further reference to FIG. 1. The rope 35 extends vertically to the top of the frame 10 where it is engaged by and passes over a pulley 50 carried on axis 51 by a pivot beam assembly 52. From this point the lift rope 35 extends laterally to one side of the frame 10 into engagement with a pulley 53 situated at the upper extremity of the lifting mechanism 39. Continuing from this point downwardly along the side of the frame 10 within a guard 54, rope 35 passes engagably with and beneath a pulley 55 rotatably mounted within the yoke 48 and then reverses direction and extends upward until it reaches a swivel support 56 affixed to the channel 40.

In operation, the initial function of the lifting mechanism 39 is to apply a force to retract the rope 35 in an upward direction simultaneously with the upward travel of the seismic gas exploder 21 after an explosion occurs therein, such that the rope 35 is always under mild, controlled tension. The springs 49—49 accomplish this result by urging the pulley 55 in a downward direction while one end of the rope 35 is held fast to the support 56. After seismic gas exploder 21 reaches the top of its travel and bears against cushions 57 attached to channels 19 by means of brackets 58, the function of the lifting mechanism 39 is optionally to catch or hold it fast or control its gradual descent to the ground, which it does by means of a hydraulic mechanism to be described. When the exploder 21 descends, it forces the piston rod 44 and associated piston upwardly within the cylinder 41 thus automatically recompressing the springs 49—49 for the next firing.

It is important to observe now that a distinct advantage is achieved by the pulley arrangement described. Clearly the rope 35 will be retracted at twice the speed which the piston 53 travels downward and correspondingly, therefore, travels twice the distance. If, for example, a total upward excursion of the seismic gas exploder 21 of four feet is to be expected (as is typical), then the supporting structure need only accommodate a travel of two feet or half that distance for the piston rod 53. This permits an overall structure of relatively low silhouette. Also, because of the high speed of the lift rope 35, it readily maintains its tension when the exploder 21 jumps vertically thus preventing the rope 35 from escaping from the grooves of the pulleys 50, 53, and 55. Necessarily, also the force applied by the springs 49—49 is twice that on the lift rope 35 so that the system is enabled to act positively while keeping the tension on the rope 35 to relatively low levels.

The springs 49—49 eliminate the need for any external power source to apply lift force on the lift rope 35 as the exploder 21 rises. Furthermore, the springs 49—49 function automatically, that is, they expand as soon as the weight of the exploder 21 is removed from the lift rope 35. By contrast, prior art devices of this general character have been concerned with the need for applying a separate lifting force on the system in proper timed relation to the application of the reaction force resulting from the explosion. Finally, it should be noted that the springs 49—49 may be selected to deliver a force directly proportional to their compression so that they are inherently adapted to provide a gradually diminishing lifting force on the rope 35 as they expand and as the force of gravity takes over to slow the ascent of the exploder 21.

The system is designed so that when the seismic exploder 21 is resting on the earth, its weight, for example, 850 to 1,000 pounds, is such that it greatly exceeds the spring force available to retract the lift rope 35, for example, 200 pounds. After explosion occurs in the seismic gas exploder 21 and it begins its upward excursion, the combined force of springs 49—49, for example, 400 pounds, will operate to exert sufficient downward pressure against the yoke 54 to carry the pulley 55 to its downward position. In this position, the slight remaining compression on the springs 49—49 will provide the system with a protection against shock loading at the upper limit of the excursion of the exploder 21. The travel of the piston rod 44 in a downward direction is, of course, determined by the total available travel distance of the piston within the hydraulic cylinder 41, which, of course, is selected such that the pulley 55 will maintain clearance from the lower end bracket 47.

It is important to note that within the scope of this invention the hydraulic cylinder 41 may be shifted from the vertical and repositioned at any desired angle. This may be done by separating the members 40 from the frame 10 and anchoring them to any other structure in fixed relation to the frame 10 which provides the necessary angular orientation.

Figure 3A:
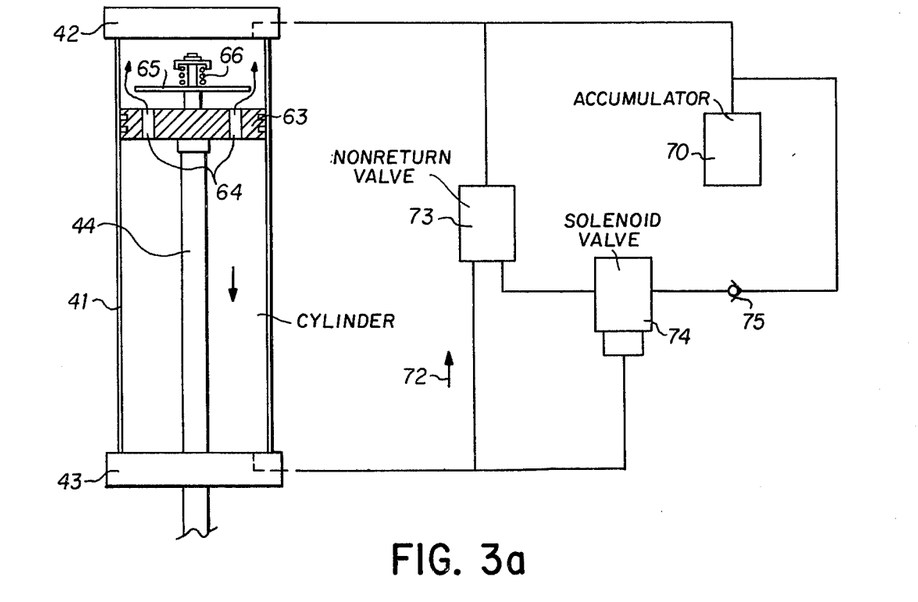
FIG. 3a is a schematic representation of the lifting mechanism of this invention shown prior to actuation of the seismic gas exploder.
Figure 3B:
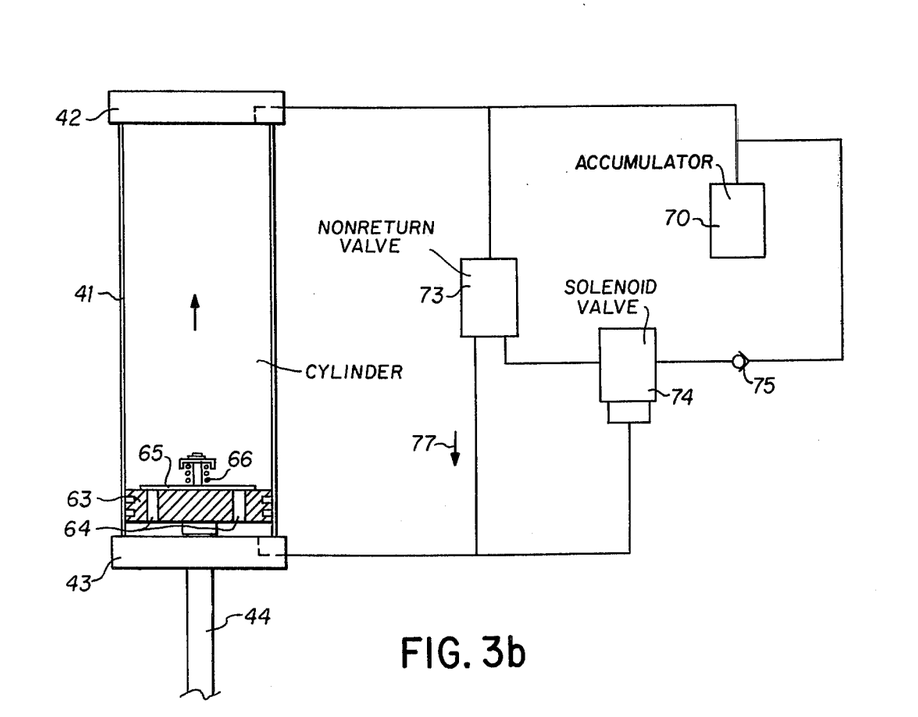
FIG. 3b is a schematic representation of the lifting mechanism of this invention as in FIG. 3a shown subsequent to actuation of the gas exploder.

In order to understand the hydraulic features of the lifting mechanism 39, attention should be directed to FIGS. 3a and 3b, illustrating in diagrammatic form the means external to the cylinder 41 for controlling flow of hydraulic fluid therein. The piston 63 which as described above is attached to the upper end of the piston rod 44, may be given a construction similar to that more particularly described in copending application Ser. No. 306,895 to Clifford D. Dransfield, filed Nov. 15, 1972, and shown in FIG. 2 thereof. This construction is designed to insure that movement of piston 63 (which is connected to the upper end of the previously described piston rod 44) in one direction, for example, downward as shown in the drawings, is subject to little resistance from the hydraulic fluid contained in the cylinder 41. Conversely, movement of the piston 63 in the opposite direction, that is, upward in the drawings, is subjected to a higher resistance. These respective downward and upward movements of the piston 63 correspond, of course, to upward and downward movement respectively of the seismic gas exploder 21. The basic construction employed to enable this mode of operation comprises providing piston 63 with a plurality of ports 64 extending therethrough, a valve plate 65 adapted to close the ports 64 when seated against them, and a spring 66 above the valve plate 65 which initially urges it in a downward direction. As piston 63 moves downward, hydraulic fluid within the cylinder 41 is forced in an upward direction through the ports 64 tending to hold the valve plate 65 away from the surface of the piston 63 so that there is substantially little resistance to the upward flow of hydraulic fluid and, consequently, to the motion of the piston 63. Conversely, when the piston 63 is moving in an upward direction, the force of spring 66 against the valve plate 65 closing ports 64 is aided and enhanced by the pressure of hydraulic fluid on the upper surface of the valve plate 65 effectively blocking fluid flow through the ports 64. Therefore, in this upward movement of the piston 63, the only available path for hydraulic fluid from one side of the piston to the other is through the external tubing.

When the system is first placed into operation, the hydraulic fluid is charged to a preselected pressure, for example, about 100 psi by means of accumulator 70 which may contain, for example, pressurized nitrogen.

As the piston 63 moves downward in the manner explained above (FIG. 3a), the volume displaced above the piston 63, which is greater than that of the fluid displaced below it, will be replaced from the accumulator 70. Fluid not passing through the ports 64 exits from the cylinder 41 from the underside of the piston 63 and flows in the direction of the arrow 72 through a pilot-operated nonreturn valve 73 connected to the upper side of the cylinder 41 and to the accumulator 70. In this mode of operation, a solenoid operated valve 74 is set to block fluid flow therethrough from the accumulator 70 to the nonreturn valve 73 through the check valve 75. This prevents fluid pressure from operating the pilot in the valve 73 to permit fluid flow therethrough in a reverse direction.

When the piston 63 reaches its bottommost position as illustrated in FIG. 3b, the seismic gas exploder 21 will have reached the upward extent of its travel; and its weight will, therefore, operate to exert downward tension on the lift rope 35 which in turn urges the piston rod 44 and the piston 63 in an upward direction. If it is desired to catch the seismic gas exploder 21 close to its uppermost position, the solenoid operated valve 74 is left in its original normally closed position, as previously described, which will prevent fluid return through valve 73 in the direction of the arrow 77 thus blocking any movement of the piston 63. At the same time, fluid pressure builds up in the accumulator 70 because of the weight of exploder 21 acting upwardly on the piston 63. As soon as this accumulator pressure builds up sufficiently, with perhaps several inches of travel of piston 63, the opposing pressures on the piston 63 will equalize, and the exploder 21 will come to rest. When it is desired to lower the exploder 21 to the ground, the valve 74 is electrically energized to permit fluid flow therethrough between the accumulator 70 and the non-return valve 73. This applies pressure to the pilot control to hold the valve 73 open permitting fluid flow therethrough in the direction of the arrow 77 so that hydraulic fluid can circulate and thus permit the piston 66 to rise within the cylinder 41. Check valve 75 is inserted to insure that pressure on the pilot of valve 73 does not fall due to pressure variation in the system. The rate of movement of the piston 63 will be controlled by the rate of flow of hydraulic fluid, which can be controlled in a conventional manner, such as by an orifice or other flow regulator. If it is desired to stop the descent of the seismic gas exploder 21, the valve 74 is de-energized so as to remove fluid pressure from the nonreturn valve 73. To insure that no pressure remains thereafter in the line to keep the valve 73 open in the direction of arrow 77, an exhaust flow path is provided at the same time through the valve 74 so that this pressure can bleed off to the low pressure side of the system.

If it is desirable to raise the exploder 21 without firing it, for purposes of repair or transport, a hand pump (not shown) may easily be incorporated in the system of FIGS. 3a and 3b. In that event, such a hand pump would, of course, apply pressure in a direction to drive the piston 63 in a downward direction.

In order to make sure that the lift rope 35 never becomes slack when the seismic gas exploder 21 is fired, the pulley 50 has been mounted on the pivot beam assembly 52. With particular reference to the top perspective view of FIG. 4, the pivot beam assembly 52 is seen to consist generally of a pair of spaced apart parallel beams 78 between which the pulley 50 is rotatably carried on axis 51 in such a manner that the lift rope 35 can pass freely upward from the exploder 21 between such beams 78 over the top of the pulley 50 and thence laterally to the side of the frame 10. The beams 78 are interconnected with a pivot 79 which is supported by a pair of parallel channel members 80 and 81 extending across the top of the frame 10. In normal operation, when the seismic gas exploder 21 is exerting tension on the lift rope 35, the pulley 50 will be urged downwardly so that the pivot beam assembly 52 is rotated into engagement with the stop plate 83 which may be conveniently bolted or otherwise affixed to the undersurfaces of the channels 80 and 81. At the same time, the other end of the pivot beam assembly 52 is rotated upwardly against the resistance of telescoping bellows 84 the upper end of which is adapted to bear against the bracket 85 secured against the upper surfaces of the channels 80 and 81.

Figure 4:
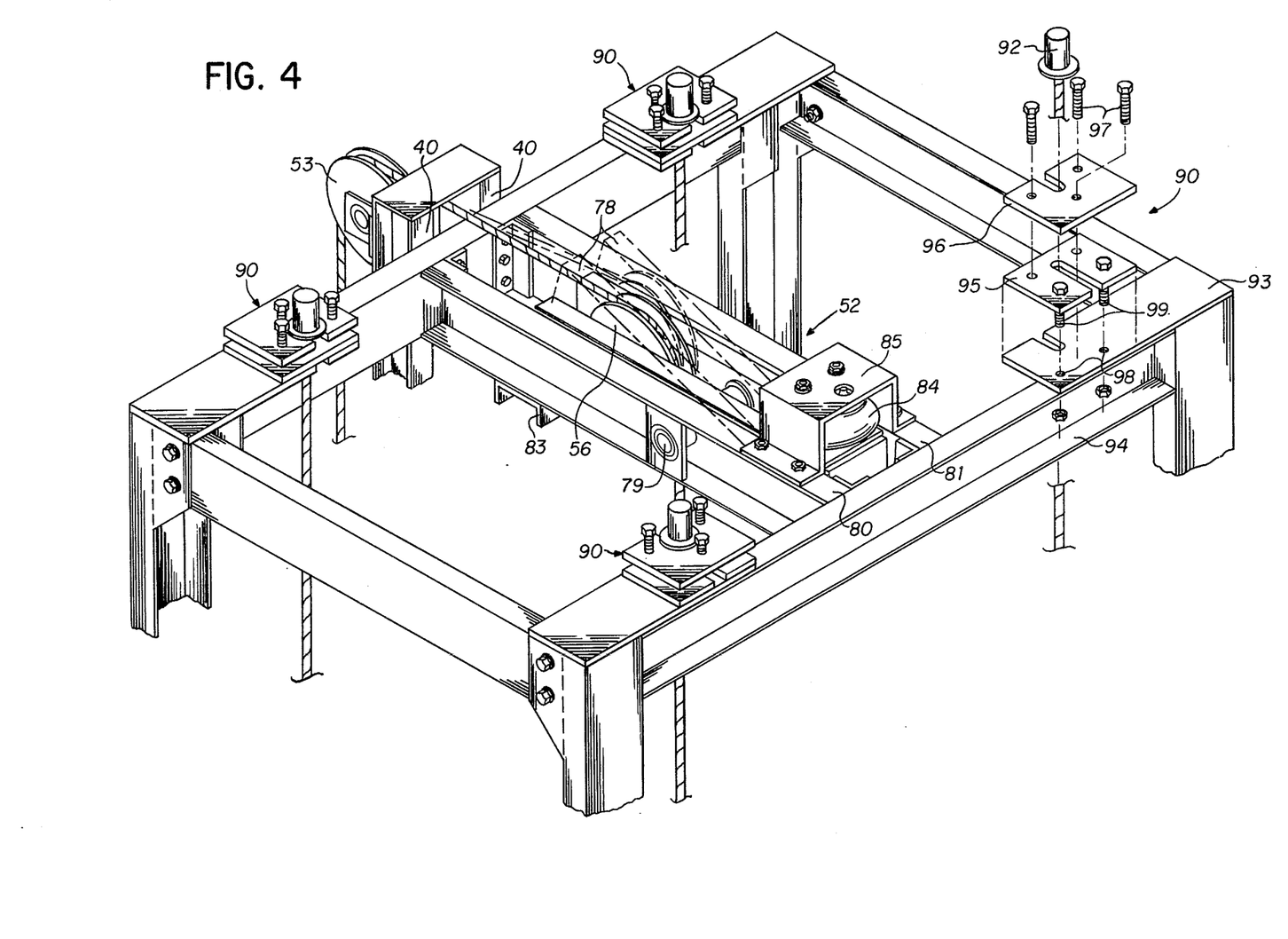
FIG. 4 is a partial isometric view of the apparatus of this invention taken from the top.

If, however, the seismic gas exploder 21 should initially jump or move in an upward direction more quickly than the compression springs 49—49 can retract the lift rope 35, it will tend to become slack and consequently remove downward pressure on the pulley 50. In consequence, the pivot beam assembly 52 will be rotated upwardly from the stop plate 83 because of the opposing downward torque exerted about the pivot 79 by means of the bellows 84. In this manner the pulley 50 will be raised to compensate for and remove any momentary slack in the lift rope 35. Obviously, the force of bellows 84 may be suitably adjusted and within the scope of this invention, it may be replaced by other well-known mechanical equivalent such as compression springs and the like. To further insure that momentary slack does not cause the rope 35 to become disengaged from its pulleys, suitably supported peripheral guards 86 and 87 may be affixed to the pulleys 53 and 55, respectively. A similar guard (not shown) may be affixed to pulley 50.

In order to pretension the guide ropes 25 to a desired degree, each of said guide members 25 is provided with a tensioning assembly 90, such as illustrated in the exploded detail of FIG. 4. In general, the lower end of each guide rope 25 is first swaged into a rope button 91 captured beneath one of the mounting pads 20 (FIG. 1). The upper end of the guide rope 25 is in like manner swaged into a rope button 92, the rope then being inserted through a laterally extending slot in a bearing pad 93 resting generally on one of a pair of cross beams 94 extending between adjacent channels 19. A retaining plate 95 above the bearing pad 93 receives and captures the guide member 25 so that it is secured in position and yet easily removed or replaced when desired. Finally, a slotted tensioning plate 96 is adapted to bear upward against the rope button 92 as adjusting screws 97 threaded therethrough exert corresponding downward pressure against the upper surface of the bearing pad 93.

It is now apparent that once the guide ropes 25 are positioned within tensioning assemblies 90 that any desired tension can be applied by means of the adjusting screws 97. Assembly is, of course, also facilitated by this construction. If it becomes desirable to have the guide members 26 extend in upwardly convergent paths, this may be readily accomplished by suitable repositioning of the bearing pads 93 with respect to the top of the frame 10. In order to secure the bearing pads 93 in any given position, they may each be provided with threaded holes 98 adapted to receive positioning screws 99 extending downwardly from the retaining plate 95 into the cross beam 94.

Although a preferred embodiment of this invention has been illustrated and described, it is to be understood that modifications may be made therein without departing from the broader spirit and scope thereof as expressed in the appended claims.

What is claimed is:

1. Apparatus for controlling the travel of a seismic gas exploder of the type adapted to apply a downwardly directed pulse to the earth and which is driven upwardly by the resultant reactive force comprising:
   a. an upstanding frame within which said seismic gas exploder is adapted to move, and said frame not being unitary with said gas exploder,
   b. means connected between the top and the bottom of said frame for guiding said seismic gas exploder, said means being elastically yieldable in a transverse direction responsive to deviation of said seismic gas exploder from a selected path defined by said guiding means.

2. Apparatus for controlling the travel of a seismic gas exploder of the type adapted to apply a downwardly directed pulse to the earth and which is driven upwardly by the resultant reactive force comprising:
   a. an upstanding frame within which said seismic gas exploder is adapted to move,
   b. a plurality of parallel elongated guide members connected between the top and bottom of said frame and disposed laterally adjacent said seismic gas exploder, and
   c. means for slidably interconnecting said guide members with said seismic gas exploder, said guide members being elastically yieldable in a transverse direction responsive to deviation of said seismic gas exploder from a selected path defined by said guide members.

3. Apparatus as in claim 2 wherein said elongated guide members are adjustably pretensioned wire ropes.

4. Apparatus as in claim 2 wherein said elongated guide members are reinforced fiberglass rods.

5. Apparatus as in claim 2 wherein said elongated guide members converge to a predetermined degree in an upward direction.

6. Apparatus as in claim 2 wherein said interconnecting means comprise a plurality of arms mounted to said seismic gas exploder extending radially from a common center into respective engagement with said elongated guide members.

7. Apparatus as in claim 6 further comprising a plurality of bushings fixed respectively to the outer extremities of said arms and adapted to encircle said elongated guide members.

8. Apparatus for imparting a seismic pulse to the earth comprising:
   a. a seismic gas exploder actuable to impart a downwardly directed pulse to the earth, said seismic gas exploder being thereafter driven upwardly by the resultant reaction force;
   b. an upstanding frame within which said seismic gas exploder is adapted to travel;
   c. lifting means mounted on said frame; and
   d. means for flexibly coupling said seismic gas exploder to said lifting means, said lifting means being enabled by the upward movement of said seismic gas exploder so as to maintain tension on said flexible coupling means.

9. Apparatus as in claim 8 including elastically yieldable guiding means interconnected between said frame and said seismic gas exploder for directing the upward travel thereof.

10. Apparatus as in claim 8 wherein said lifting means includes a source of hydraulic fluid, a piston movable within said hydraulic fluid, spring means adapted to urge said piston in one direction to exert a tensile force on said coupling means responsive to movement of said seismic gas exploder, and means actuable responsive to the movement of said piston for controlling the flow of said hydraulic fluid so as to impart a lower resistance to the movement of said piston in said one direction and a higher resistance to movement in an opposite direction.

11. Apparatus as in claim 8 wherein said lifting means comprises a hydraulic cylinder mounted on said frame, a piston movable within said cylinder, fluid means for controllably damping the movement of said piston, a piston rod connected to said piston having its free end projecting outwardly from said cylinder, spring means interconnecting said cylinder and said piston rod and adapted to apply a force to further extend said free end of the piston rod from said cylinder, and means coupling the seismic gas exploder to said free end of said piston rod adapted to apply the weight of the seismic gas exploder in opposition to the force of said spring means.

12. Apparatus as in claim 11 wherein said coupling means comprises a lifting rope adapted to support the weight of said seismic gas exploder and interconnected between said seismic gas exploder and the free end of the piston rod, said cylinder being oriented so that the weight of said seismic gas exploder may be transmitted through said lifting rope to said piston rod.

13. Apparatus as in claim 12 wherein said cylinder is longitudinally aligned with said frame and wherein the free end of said piston rod projects downwardly from said cylinder and further comprising a first pulley positioned above said seismic gas exploder, a second pulley laterally spaced from said first pulley above said hydraulic cylinder, and a third pulley mounted on the free end of said piston rod, said first, second and third pulleys being rotatable about horizontal axes, said lifting rope having one end fixed to the seismic gas exploder and extending therefrom over said first and second pulleys and under said third pulley in cooperative engagement therewith, the other end of said lifting rope being fixed to said frame, so as to support said piston rod upwardly against the downwardly directed force of said spring means.

14. Apparatus as in claim 13 further comprising means for limiting the travel of said piston rod from said cylinder so that said spring means may not completely relax.

15. Apparatus as in claim 8 further comprising elongated pivot means mounted at the top of the frame and extending laterally thereof, said pivot means being pivoted intermediate its ends on a further horizontal axis, one end of said pivot means being adapted to support said first pulley, means for limiting the downward travel of said one end of said pivot means about said axis responsive to loading on said lifting rope, and means for constantly urging the other end of said pivot means in a downward direction about said axis, whereby said first pulley may be urged upwardly responsive to slackening in said lifting rope.

16. Apparatus as in claim 15 wherein said means for urging said other end of said pivot means in a downward direction is a telescoping bellows interconnecting said other end and said frame.

17. Apparatus as in claim 15 wherein said means for urging the other end of said pivot means in a downward direction is a spring.

18. Apparatus as in claim 8 wherein said lifting means comprises a stationary hydraulic cylinder, a piston slidably supported within said cylinder, a piston rod connected to said piston having its free end projecting outwardly from said cylinder, a pair of parallel tubular guide members extending along opposite sides of the cylinder in fixed spaced relation thereto, a yoke fixed to the free end of the piston rod extending laterally to slidably interconnect said piston rod with said tubular members, and a pair of similar compression coil springs surrounding said tubular members respectively and compressed between said cylinder and said yoke, whereby the expansion of said coil springs is adapted to urge said piston rod farther outward from said cylinder.

19. The method of controlling the travel of the seismic gas exploder adapted to impart a downwardly directed pulse to the earth with a resultant reaction lifting force thereon wherein the seismic gas exploder is permitted to travel freely upward and thereafter gradually descend under the control of a lifting device comprising the steps of:
   a. supporting the seismic gas exploder from said lifting device at one end of a flexible connector adapted to be retracted by means of said lifting device;
   b. actuating said lifting device by means of an energy source released by the upward movement of said seismic gas exploder to retract the flexible connector at a speed sufficient to maintain tension therein during the upward travel of said seismic gas exploder; and
   c. exerting the downward force of said seismic gas exploder on said flexible connector during the descent thereof to restore the source of energy for the actuation of said lifting device.

20. The method of claim 19 wherein the force applied to actuate said lifting device results from the expansion of spring means normally disabled by the weight of the gas exploder and wherein said force diminishes in proportion to the upward distance traveled by said gas exploder.

21. The method of claim 20 including the additional steps of guiding the gas exploder upwardly responsive to said reaction lifting force and providing said gas exploder with elastic lateral support in cooperation with said guidance step.

22. In the method of imparting a seismic pulse to the earth wherein a seismic gas exploder is allowed to rise freely subsequent to an explosion therein to the upper limit of its travel and then descend gradually to the ground and wherein said seismic gas exploder is coupled by nonrigid means to a hydraulic cylinder in which the movement of a piston is controllable to impart variable lifting force to said seismic gas exploder through said nonrigid means, the improvement comprising the steps of:
   a. actuating said seismic gas exploder to impart a seismic pulse to the earth with a resultant reaction lifting force acting thereon;
   b. applying the stored energy of spring means normally disabled by the weight of the seismic gas exploder to move said piston in one direction to maintain tension in said nonrigid means responsive to the upward movement of said seismic gas exploder and until said seismic gas exploder reaches the upper limit of its travel; and
   c. applying the weight of said seismic gas exploder during the descent thereof to move said piston in an opposite direction so as to restore the energy of said spring means.

* * * * *

UNITED STATES PATENT OFFICE
CERTIFICATE OF CORRECTION

Patent No. 3,951,229　　　　　　　　　　Dated April 20, 1976

Inventor(s) Clifford D. Dransfield

It is certified that error appears in the above-identified patent and that said Letters Patent are hereby corrected as shown below:

Columns 3 and 4 should be deleted and the attached columns 3 and 4 substituted therefor.

Column 4, line 37 of the attached column 4, "14" should read -- 41 --.

Signed and Sealed this

First Day of March 1977

[SEAL]

Attest:

RUTH C. MASON
*Attesting Officer*

C. MARSHALL DANN
*Commissioner of Patents and Trademarks*

FIG. 4 is a partial isometric view of the apparatus of this invention taken from the top.

DETAILED DESCRIPTION

With reference now to the preferred embodiment illustrated in FIG. 1 of the drawings, an upstanding frame 10 may be conveniently mounted on a transporting vehicle such as a sled 11, having runners 12 adapted to rest on the ground. Retractable wheels (not shown) can easily be added to enhance the versatility of the vehicle. The front and rear ends of the sled 11 have been omitted from the showing of the drawing as unessential to understanding of the invention. It will be understood also from what follows that within the scope of this invention the frame 10 may be mounted directly on the ground rather than being supported from a movable vehicle. As shown, the support means for the frame 10 may conveniently consist of pairs of horizontally flanged plates 15 bolted or fastened at suitable intervals to opposite vertical edges of the runners 12 so as to provide flat bearing surfaces for I-beams 16 extending transversely of the two sled runners 12. The bottom ends of each of four channel members 19 establishing the general outline of frame 10 may be secured to the I-beams 16 through a plurality of intermediate mounting pads 20.

Supported from the frame 10 and shown resting on the earth is a seismic gas exploder 21 which may be constructed in any of various ways well-known in the art. As shown, for example, it may include a cylinder 22 with an expansible explosion chamber therein and an impact mass or pan 23 formed on the bottom thereof. Also within the frame 10 and close to the four corners thereof formed by the channel members 19, there are positioned a like number of parallel elongated guide members 25, such as semi-rigid bright wire ropes or flexible fiberglass or steel rods having their ends attached respectively to the top and the bottom of the frame 10. The purpose of the guide members 25 is to direct the upward travel of the seismic gas exploder 21 subsequent to an explosion therein until it reaches the limit of its travel shown in phantom.

The top of the cylinder 22 may be provided with a flange 26 to which may be bolted or otherwise fastened an annular cover 27 formed with a central aperture to accommodate the travel of the reaction mass or piston (not shown) of the exploder 21. The cover 27 supports a spider assembly consisting of a plurality of radially extending arms 28 joined to a hub 29 concentric with the cylinder 22, the undersurfaces of the arms 28 being appropriately curved to provide sufficient clearance for piston movement. It will be understood that suitable connections (not shown) may be made to the upper surface of the piston for introduction into the expansible chamber of an explosive mixture in a manner well-known to the art. The extremities of the arms 28 are furnished respectively with split eyelet bushings 34 adapted to encircle the rope or guide members 25 so as to direct the seismic gas exploder 21 slidably therealong in an upward direction.

In firing the seismic gas exploder 21, particularly on uneven or sloping ground, the supporting structures and associated equipment can be subjected to tremendous side loads or shocks. With rigid vertical restraining guide members such as are provided in the prior art, the severity of these shocks can reach intolerable levels. Therefore, the guide ropes 25 are adapted to provide elastically yieldable restraint against sideways motion of the seismic gas exploder 21 in the event it is fired with the pan 23 at an angle. The degree of elastic restraint provided by the guide members 25 can be varied by adjusting the tension applied thereto in a vertical direction. Also, the mounting location of the upper ends of the ropes 25 can be adjusted so that they converge slightly from bottom to top to exert a progressively greater resistance to the upward movement of the seismic gas exploder 21 as it moves from the ground.

Attached to the hub 29 is one end of the lift rope 35 which may be fastened thereto by means of an eye bolt 36 at a mating clevis 37 to which one end of the lift rope 35 is clamped or otherwise securely fastened. After passing over the top of the frame 10, the lift rope 35 extends downwardly along one side of the frame 10 where it makes effective connection with the lifting mechanism 39 in a manner to be described. Finally, its other end is fastened to one of a pair of channels 40 extending vertically along the frame 10 midway between two of its adjacent channel members 19 by means of which the lifting mechanism 39 is mounted to frame 10.

The external mechanical features of the lifting mechanism 39 may be better appreciated by a consideration of FIGS. 1 and 2 together, the former presenting a side view thereof as attached to the frame 10 and the latter a frontal detail of the mechanism. In FIG. 1 the lifting mechanism 39 is illustrated with its movable elements in their upper position prior to firing of the exploder 21, their lower moved position after the exploder 21 has been fired and driven upwardly being shown in phantom. In FIG. 2 the lifting mechanism 39 is illustrated with the movable elements in their lower position, with the upper position thereof being correspondingly shown in phantom.

A hydraulic cylinder 14 extends in a vertical direction between the upper and lower mounting brackets 42 and 43 suitably fastened, as by welding, to the channels 40. The upper end of a piston rod 44 (FIG. 2) is attached within the cylinder 41 to a piston (not seen in this view) movable against variable fluid resistance, while the lower end of the piston rod 44 projects downwardly beneath the lower end of the cylinder 41. Extending along the two sides of the cylinder 41 in longitudinal alignment therewith are a pair of stationary cylindrical guide tubes 45—45 fastened at their respective upper ends to an upper end bracket 46 fixed to the channel 40 and at their lower ends to a lower end bracket 47 forming the bottom extremity of the lifting mechanism 39. The lower end of the piston rod 44 is threaded into or otherwise fixed to a yoke 48 having suitable laterally separated apertures therethrough to receive the guide tubes 45—45. These apertures are fitted with suitable bearing surfaces so that the yoke 48 will slide smoothly along the guide tubes 45—45 with extension or retraction of the piston rod 44 in a vertical direction. A pair of compression coil springs 49—49 are located around the two guide tubes 45—45, their upper ends adapted to bear against the upper brackets 46 and their lower ends against the yoke 48. Both ends of the springs 49—49, however, are free of any attachment to these bearing surfaces.

When the piston rod 44 is in its extreme upper position, as shown in FIG. 1, the springs 49—49 are under strong compression tending to urge the piston rod 44 in a downward direction until it is fully extended as shown